United States Patent Office 2,734,907
Patented Feb. 14, 1956

2,734,907

PROCESS FOR THE PRODUCTION OF Δ⁴-3-KETO-PREGNENES

Robert H. Levin, Kalamazoo Township, Kalamazoo County, and Barney J. Magerlein and A Vern McIntosh, Jr., Kalamazoo, Mich., assignors to The Upjohn Company, Kalamazoo, Mich., a corporation of Michigan No Drawing. Application October 27, 1952,
Serial No. 317,156

14 Claims. (Cl. 260—397.45)

The present invention relates to a chemical process and is more particularly concerned with a novel process for the conversion of certain 3-cyclic ketals of steroid 4-halo-3,20-diketones having a pregnane carbon skeleton to the corresponding α,β-unsaturated 3-ketosteroids.

This application is a continuation-in-part of our copending applications, Serial Numbers 304,851 and 304,852 filed August 16, 1952.

It is an object of the present invention to provide a novel process for the simultaneous hydrolysis and dehydrohalogenation of cyclic ketals of steroid 4-halo-3,20-diketones having a pregnane carbon skeleton. A further object of the invention is the provision of a process whereby a steroid 4-halo-3-cyclic ketal, having a pregnane carbon skeleton, is converted to a Δ⁴-3-ketosteroid having a pregnane carbon skeleton. Other objects of the invention will be apparent to those skilled in the art to which this invention pertains.

According to the process of the present invention, the 4-halo-3-ketal moiety in a steroid 4-halo-3,20-diketone having a pregnane carbon skeleton is converted to an α,β-unsaturated ketone group. The α,β-unsaturated ketone group (Δ⁴-3-keto) is an essential part of the nucleus in most of the steroid hormones. Such physiologically active steroid hormones as 17α-hydroxy-corticosterone (also known as Kendall's Compound F), cortisone, progesterone, testosterone, and others, contain this α,β-unsaturated ketone system as an integral part of the nucleus.

One of the major problems in the synthetic approach to those harmones has been the establishment of the α,β-unsaturated ketone system in the A ring of the steroid nucleus. All of the practical methods known in the art for the establishment of the α,β-unsaturated ketone system in the A ring of a steroid nucleus utilize, as starting material, a 4-halo-3-ketosteroid. These methods are of no value where the starting material is other than a 4-halo-3-ketosteroid such as, for example, a 4-halo-3-ketosteroid wherein the 3-keto group has been replaced by a blocking group such as a cyclic ketal. As has been disclosed in our copending application, Serial Number 304,852, filed August 16, 1952, it is sometimes advantageous to prepare 4-halo-3-cyclic ketal steroids. This is particularly true in the preparation of 17α-hydroxycorticosterone wherein the 3-keto group must be protected while other transformations in the steroid molecule are conducted. It has been found that once a protecting group, such as a cyclic ketal, is at the 3-position of a 4-halo-3-ketosteroid, such a group is difficult to remove for the purpose of reestablishing the 3-keto group. Therefore, a process which causes simultaneous removal of the 3-cyclic ketal group and formation of the double bond at the 4(5)-position is of considerable commercial significance. The present invention provides a process for the establishment of the α,β-unsaturated ketone system in the A ring of the steroid nucleus from a 4-halo-3-cyclic ketal steroid.

For example, 17α-hydroxycorticosterone 21-acetate (Compound F acetate) is prepared from 3α,11α,17α-trihydroxypregnane-20-one [which is prepared from 3α,11α,20 - triacetoxy-17-pregnene (Marshall et al., J. Am. Chem. Soc., 70, 1837 (1948)) by epoxidation with a peracid followed by saponification of the epoxide with a base] by a series of reactions utilizing the process of the present invention. Thus, 3α,11α,17α-trihydroxypregnane-20-one is treated with tertiary butyl hypochlorite in tertiary butyl alcohol to cause simultaneous oxidation-halogenation and yield 4-chloro-11α,17α-dihydroxypregnane-3,20-dione which on ketalization with ethylene glycol, as disclosed in our copending application Serial No. 304,851, filed August 16, 1952, is productive of 4 - chloro - 11α,17α-dihydroxypregnane-3,20-dione 3,20-ethylene glycol diketal. Conversion of the 11α-hydroxy group to an 11β-hydroxy group is accomplished by oxidation with chromic acid of the thus-produced diketal to yield the 11-keto compound which on reduction with lithium aluminum hydride, or other reduction procedure, results in formation of the 11β-hydroxy compound, 4-chloro-11β,17α-dihydroxypregnane-3,20-dione 3,20-ethylene glycol ketal. As disclosed in our copending application Serial No. 304,852, filed August 16, 1952, 4-chloro-11β,17α-dihydroxypregnane-3,20-dione 3,20-ethylene glycol ketal is converted to 17α-hydroxycorticosterone 21-acetate by a series of reactions which include partial hydrolysis of the diketal with sulfuric acid to yield the monoketal, 4-chloro-11β,17α-dihydroxypregnane-3,20-dione 3-ethylene glycol ketal. The 21-acetoxy group is then introduced by brominating, with bromine in chloroform, and treating the thus-produced 21-bromide with potassium acetate in acetone. The thus-obtained 4-chloro-11β,17α-dihydroxy-21-acetoxypregnane-3,20-dione 3-ketal on treatment with 2,4-dinitrophenylhydrazine results in the formation of the 3-(2,4-dinitrophenylhydrazone) with elimination of hydrogen halide to form a double bond between carbon atoms four and five. Removal of the hydrazone group with pyruvic acid gives 17α-hydroxycorticosterone 21-acetate. If it is desired to prepare 17α-hydroxycorticosterone instead of the acetate, the acetoxylation step is omitted and the 21-bromide is treated with a base to yield a 4-halo-11β,17α,21-trihydroxypregnane-3,20-dione 3-ketal, which on treatment with 2,4-dinitrophenylhydrazine followed by pyruvic acid gives 17α-hydroxycorticosterone.

Representative starting 4-halo-3-cyclic ketal steroids for the process of the present invention are illustrated by the following structural formula:

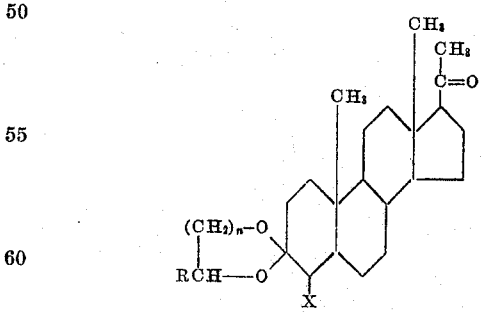

wherein X is a halogen selected from the group consisting of chlorine and bromine, and wherein R is selected from the group consisting of hydrogen and lower-alkyl groups, such as, for example, methyl, ethyl, propyl, isopropyl, butyl, 1-methylpropyl, amyl, hexyl, and the like, and $n$ is an integer from one to two, inclusive. Of the starting 3-cyclic ketals, the lower-alkylene cyclic ketals, formed from 1,2-alkanediols are preferred. The pregnane carbon skeleton of these compounds may have substituents such as, for example, ketone, hydroxy, acyloxy, carboxy, carbalkoxy, and the like, attached to one or more of the carbon atoms of the pregnane carbon skeleton such as, for example, in the 6, 7, 11, 12, 17, 21, and other positions. In addition, double bonds may be present in the various positions of the steroid nucleus such as, for example, 6, 7, 8, 9, 11, 14, 15, and other positions. The 4-halo-3-ketals especially preferred are those wherein the pregnane carbon skeleton has substituents at positions 11, 17, and 21. Other steroid 3-ketals of steroid 4-halo-3,20-diketones having a pregnane carbon skeleton are also included as starting material within the scope of the invention, it being understood that the above formula is representative only, and that the starting materials are not limited solely thereto.

Representative starting materials for the process of the present invention include 4-chloropregnane-3,20-dione 3-propane-1,3-diol ketal, 4-chloropregnane-3,20-dione 3-octane-1,3-diol ketal, 4-chloropregnane-3,20-dione 3-butane-1,2-diol ketal, 4-chloropregnane-3,20-dione 3-butane-2,3-diol ketal, 4 - chloro - 17α-hydroxypregnane-3,20-dione 3-ethylene glycol ketal, 4-chloro-17α-hydroxypregnane-3,20-dione 3-propane-1,2-diol ketal, 4-chloro-17α-hydroxypregnane-3,20-dione 3 - pentane-1,2-diol ketal, 4-chloropregnane-3,11,20-trione 3-ethylene glycol ketal, 4-chloropregnane-3,11,20-trione 3-butane-1,3-diol ketal, 4-chloro-21-hydroxypregnane-3,20-dione 3-ethylene glycol ketal, 4-chloro-11α-hydroxypregnane-3,20-dione 3-ethylene glycol ketal, 4-chloro-11α-hydroxypregnane-3,20-dione 3-hexane-1,2-diol ketal, 4-chloro-11β-hydroxypregnane-3,20-dione 3-ethylene glycol ketal, 4-chloro-11α,17α-dihydroxypregnane,3,20-dione 3-propane-1,2-diol ketal, 4-chloro-11α,17α-dihydroxypregnane-3,20-dione 3-propane-1,3-diol ketal, 4-chloro-11β,17α,21-trihydroxypregnane - 3,20 - dione 3-butane-2,3-diol ketal, 4-chloro-11α,17α-dihydroxypregnane-3,20-dione 3-butane - 1,2 - diol ketal, 4-chloro-11β,17α-dihydroxy-21-acetoxypregnane-3,20-dione 3-ethylene glycol ketal, 4 - chloro-11α-acetoxy-17α-hydroxypregnane-3,20-dione 3-ethylene glycol ketal, 4-chloro-11α-acetoxy-17α-hydroxypregnane-3,20-dione 3-butane-1,3-diol ketal, 4-chloro-12-acetoxypregnane-3,20-dione 3-butane-1,3-diol ketal, 4-chloro-12-acetoxypregnane-3,20-dione 3-ethylene glycol ketal, 4-chloro-6-acetoxypregnane-3,20-dione 3-ethylene glycol ketal, 4-chloro-11-pregnene-3,20-dione 3-ethylene glycol ketal, 4-chloro-9(11)-pregnene-3,20-dione 3-ethylene glycol ketal, the corresponding 4-bromo-3-ketals, and the like.

The starting compounds for the present invention are prepared by the preferential hydrolysis of a steroid 4-halo-3,20-diketal having a pregnane carbon skeleton to give a steroid 4-halo-3-monoketal having a pregnane carbon skeleton, as disclosed in our copending application, Serial No. 304,852, filed August 16, 1952. In carrying out the selective hydrolysis, the steroid 4-halo-3,20-diketal is dissolved in an organic solvent and this solution is admixed with at least the theoretical amount, and preferably an excess, of an acid hydrolyzing agent. The organic solvent may be either of the water-miscible type such as, for example, acetone, methanol, ethanol, dioxane, and the like, or the organic solvent may be of the water-immiscible type such as, for example, ether, benzene, chloroform, hexane, and the like. If a water-miscible solvent is used, the reaction takes place in a homogeneous system, whereas if a water-immiscible solvent is utilized the reaction mixture forms a two-phase heterogeneous system which must be stirred in order to bring the reactants in contact with each other and cause hydrolysis. Ordinarily, it is preferred to use a temperature between about twenty and about forty degrees centigrade in carrying out the reaction, but temperatures as low as zero and as high as 100 degrees centigrade or even higher are operative. The time required for the reaction is not critical and may be varied between about one and about 24 hours, the length of time being dependent on the temperature and the hydrolyzing agent employed. The amount of hydrolyzing agent employed may be varied over a wide range, and it is preferred to use an excess of the hydrolyzing agent, preferably between about five and about fifty moles per mole of starting steroid. The acid hydrolyzing agent employed is a strong acid such as, for example, sulfuric acid, hydrochloric acid, meta- and para-toluenesulfonic acids, naphthalenesulfonic acid, benzenesulfonic acid, ortho-chlorobenzenesulfonic acid, trichloroacetic acid, and the like, with sulfuric acid and hydrochloric acid being the preferred acids.

The steroid 4-halo-3,20-diketals, utilized in preparation of the starting material for the process of the present invention, are prepared, as disclosed in our copending application Serial No. 304,851, filed August 16, 1952, by reacting a steroid 4-halo-13,20-diketone having a pregnane carbon skeleton with an alkanediol, e. g., an alkane-1,2-diol or an alkane-1,3-diol, in the presence of an acid catalyst at a temperature below about 200 degrees centigrade, preferably under reflux conditions, to cause conversion of the 3- and 20-ketone groups to ketal groups. In carrying out the reaction, the starting 4-halo-3,20-diketone compound is admixed, using either order of addition, with at least the theoretical amount of the alkanediol in an organic solvent, which is non-reactive under the reaction conditions, e. g., at a temperature between about twenty and about 200 degrees centigrade, preferably between about twenty and 150 degrees centigrade. Ordinarily, it is preferred to use an excess of the alkanediol, preferably between about five and about fifty moles per mole of the steroid. The time required for reaction is not critical and may be varied between about one and about 24 hours, the length of time being dependent on the temperature, the ketalizing reagent and catalyst employed.

The reaction can be conducted in any organic solvent with which the reactants and products are non-reactive such as, for example, benzene, toluene, xylene, methylene chloride, petroleum ether, ether, and the like. However, the preferred solvents are those which form an azeotrope with water and hence remove the water as it is formed in the course of the reaction. For this reason the reaction is usually conducted at the reflux temperature of the mixture, such temperature depending, of course, upon the solvent and the particular reaction conditions, e. g., pressure, employed.

The ketal-forming agents are alkanediols, e. g., alkane-1,2-diols and alkane-1,3-diols, such as, for example, ethylene glycol, propane-1,2-diol, propane-1,3-diol, butane-1,2-diol, butane-2,3-diol, pentane-1,2-diol, 3-methylpentane-1,2-diol, hexane-1,3-diol, octane-1,2-diol, and the like. The catalyst may be any suitable acid catalyst and is preferably a mineral acid or an organic sulfonic acid. Representative catalysts are the meta- and para-toluenesulfonic acids, naphthalenesulfonic acid, benzenesulfonic acid, ortho-chlorobenzenesulfonic acid, hydrochloric acid, and sulfuric acid, with para-toluenesulfonic acid being the preferred acid catalyst.

In addition to the ketalizing method described above for preparing the 3,20-diketal compounds, steroid 4-halo-11β-hydroxy-3,20-diketals may also be prepared by reduction of a steroid 4-halo-11-keto-3,20-diketal. In carrying out the reduction, a reducing agent is admixed with a steroid 4-halo-11-keto-3,20-diketal in the presence of an organic solvent which is non-reactive under the conditions of reaction. Reducing agents such as, for example, lithium aluminum hydride, lithium borohydride, sodium borohydride, hydrogen in the presene of catalysts such as platinum or Raney nickel, and others are operative, with lithium aluminum hydride being preferred. Solvents such as, for example, ether, benzene, tetrahydrofuran, petroleum ether and others are satisfactory. In the preferred embodiment of the process, lithium aluminum hydride is admixed with a suitable organic solvent such as, for example, ether, and the starting steroid dissolved in a non-reactive solvent such as, for example, benzene, and the admixtures then combined to form the reaction mixture. The temperature of the reaction mixture is usually maintained between about zero and about 100 degrees centigrade, with a temperature between about room temperature and the reflux temperature of the reaction mixture being preferred, for a reaction period varying from about one-half to about eight hours or more, with about two hours being preferred. The ratio of reducing agent to starting steroid may be varied considerably over a wide range, a substantial excess of the reducing agent generally being employed with mole-ratios of up to fifty to one and above being operative.

According to the process of the present invention a 4-halo-3-cyclic ketal steroid having a pregnane carbon skeleton is converted to a $\Delta^4$-3-ketosteroid having a pregnane carbon skeleton. In carrying out the process of the present invention, the steroid 4-halo-3-cyclic ketal is admixed, in an organic solvent, with an acid hydrolyzing agent and a nitrogen carbonyl reagent. Acid hydrolyzing agents generally employed include mineral acids, organic acids such as the lower-alkanoic acids including, for example, acetic acid, propionic acid, and the like, sulfonic acids such as para-toluenesulfonic acid in the presence of water, phosphoric acid, and others, with dilute mineral acids such as hydrochloric and sulfuric being preferred. The reaction mixture is heated at a temperature below about 100 degrees centigrade, preferably between about twenty and about eighty degrees centigrade, for a period of about one to about five hours, to cause conversion of the 3-keto group to a 3-ketonic nitrogen derivative and, concurrently to remove, as hydrogen halide, the halogen atom from carbon atom four and a hydrogen atom from carbon atom five. The $\alpha,\beta$-unsaturated 3-ketonic nitrogen derivative thus-formed, is then reacted, usually but not necessarily in the same solvent, at a temperature below about 100 degrees centigrade, preferably between about twenty and about eighty degrees centigrade and in the presence of water, with an agent capable of entering into an exchange reaction to form the $\alpha,\beta$-unsaturated 3-ketosteroid and the nitrogen ketonic derivative of the exchange reagent. The $\Delta^4$-3-ketosteroid thus-produced is isolated by any of the usual methods such as, for example, extraction with an organic solvent such as chloroform, ether, benzene, or the like.

Representative carbonyl reagents used as dehydrohalogenating agents in the process of the present invention are semicarbazide, hydrazine, phenylhydrazine, 2,4-dinitrophenylhydrazine, hydroxylamine, and the like, with hydrazine and the substituted hydrazines, especially semicarbazide, being preferred. The hydrochlorides of these bases may be used in the reaction mixture provided that the free base is released by treatment with a base such as, for example, sodium acetate. These reagents have been found to possess the capacity of effecting simultaneous dehydrohalogenation at the 4(5)-positions of the steroid nucleus and to effect conversion of the 3-keto group to a ketonic nitrogen derivative. For accomplishment of such result and attainment of highest yields, at least the theoretical amount of ketonic reagent should be employed. Ordinarily, it is preferred to use an excess of dehydrohalogenation reagent over the theoretical amount, e. g., from about one mole to about three moles of reagent per mole of steroid.

Organic solvents which may be used in the dehydrohalogenation or the exchange steps in the process of the present invention are acetic acid, dioxane, tertiary butyl alcohol, tetrahydrofuran and the like, and the selection of a suitable solvent will be apparent to one skilled in the art.

Representative exchange agents which may be used in the exchange step of the process of the present invention are pyruvic acid, benzaldehyde, para-hydroxybenzaldehyde, ortho-hydroxybenzaldehyde, and the like.

The process of the invention may be illustrated by the formulae

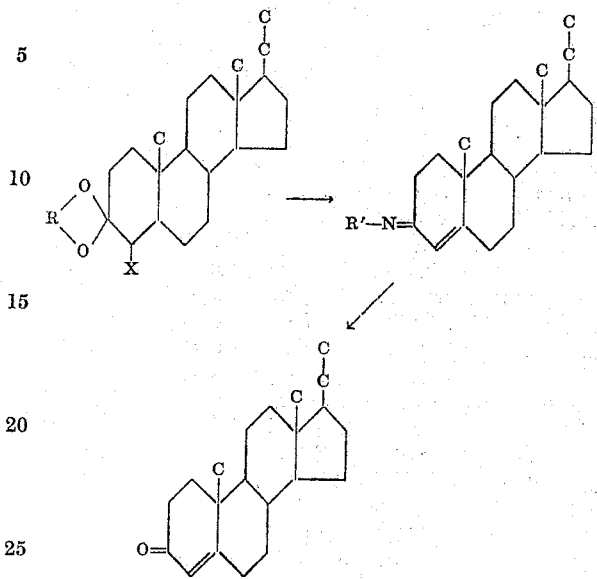

wherein

is a cyclic ketal group, X is halogen, and R'—N= is a nitrogen carbonyl reagent minus the two hydrogen atoms on a terminal amino group.

Sometimes, in carrying out the process of the present invention, ester groups, if present in the starting 4-halo-3-cyclic ketal steroid, are partially hydrolyzed. This hydrolysis is of no consequence in the operativeness of the process, but in some instances it may be somewhat inconvenient in the isolation and purification of the product. In such instances the difficulty can be conveniently overcome by reacylation of the reaction product before isolation.

The following examples are illustrative of the process and products of the present invention but are not to be construed as limiting.

PREPARATION 1.—4-CHLORO-17α-HYDROXYPREGNANE-3,11,20-TRIONE

A solution of 25 grams of 3α,17α-dihydroxypregnane-11,20-dione [Sarett, J. Am. Chem. Soc., 70, 1454 (1948)] in 380 milliliters of tertiary butyl alcohol was admixed with five milliliters of concentrated hydrochloric acid and twelve milliliters of water, and thereafter cooled to about fifteen degrees centigrade. Eighteen milliliters (2.2 molar equivalents) of tertiary butyl hypochlorite was then added thereto, whereupon the temperature rose to about 26 degrees centigrade. The reaction mixture was stirred for 4.5 hours although the iodometric titration of an aliquot sample taken from the reaction mixture after two hours showed the reaction to be essentially complete. The volatile components of the reaction mixture were removed by distillation at reduced pressure leaving a 24.59 gram residue (a yield of 90.6 percent of the theoretical, corrected for the samples taken from the reaction mixture for iodometric titrations) of 4-chloro-17α-hydroxypregnane-3,11,20-trione melting without purification at 220 to 225 degrees centigrade and having an [α]$_D$ of plus 91 degrees (acetone).

The corresponding 4-bromo compound is prepared according to the procedure of Kritchevsky, et al., [J. Am. Chem. Soc., 74, 483 (1952)].

PREPARATION 2.—4-CHLORO-17α-HYDROXYPREGNANE-3,11,20-TRIONE 3,20-ETHYLENE GLYCOL DIKETAL

A solution of five grams of 4-chloro-17α-hydroxypregnane-3,11,20-trione (from Preparation 1), ten milliliters of ethylene glycol, 0.30 gram of para-toluenesulfonic acid monohydrate and 500 milliliters of benzene was placed in a reaction flask which was equipped with a reflux condenser and a water trap so arranged that the condensed vapors passed through the water trap before returning to the reaction flask. The mixture was heated to reflux and was allowed to reflux for six hours while at the same time being agitated. The water which formed was removed by co-distillation with benzene and was collected in the water trap. The reaction mixture was cooled, washed with a dilute solution of sodium bicarbonate and with water, and then dried and concentrated to dryness under reduced pressure. The white crystalline residue was dissolved in 85 milliliters of ethyl acetate and the solution was cooled until crystallization took place. The crystalline 4-chloro-17α-hydroxypregnane-3,11,20-trione 3,20-ethylene glycol diketal was isolated by filtration and weighed 1.986 grams; melting point 232 to 236 degrees centigrade. A second crop of 1.928 grams; melting point 232 to 235 degrees centigrade, was obtained by concentration of the mother liquor. The two crops were combined and recrystallized from methylene chloride-hexane, benzene, and ethyl acetate to yield purified product of melting point 239 to 242 degrees centigrade; $[\alpha]_D^{23}$ plus 55 degrees (acetone).

*Analysis.*—Per cent calculated for $C_{25}H_{37}O_6Cl$: C, 64.02; H, 7.95; Cl, 7.56. Found: C, 64.57; H, 7.86; Cl, 7.55.

PREPARATION 3.—4-CHLORO-11β,17α-DIHYDROXYPREGNANE-3,20-DIONE 3,20-ETHYLENE GLYCOL DIKETAL

To a solution of thirteen grams of lithium aluminum hydride in one liter of anhydrous ether was added, with stirring, a solution of 13.79 grams of 4-chloro-17α-hydroxypregnane-3,11,20-trione 3,20-ethylene glycol diketal (from Preparation 2) in 200 milliliters of benzene. The reaction mixture was stirred at room temperature for one hour and was then heated at reflux for an additional hour. After cooling, the mixture was hydrolyzed by the cautious addition of a solution of 100 milliliters of hydrochloric acid in 150 milliliters of water. Stirring at room temperature was continued for several hours, after which the organic layer was separated and the water layer was extracted with methylene chloride. The methylene chloride extract was combined with the organic layer and the whole was washed with water and dilute sodium bicarbonate solution, dried and evaporated to dryness. The residue was triturated with ether and yielded 8.38 grams of 4-chloro-11β,17α-dihydroxypregnane-3,20-dione 3,20-ethylene glycol diketal; melting point 212 to 218 degrees centigrade. An additional 1.51 grams was obtained from the ether mother liquor. Several recrystallizations from a mixture of ethyl acetate-hexane gave purified material melting at 222 to 224 degrees centigrade.

*Analysis.*—Per cent calculated for $C_{25}H_{39}O_6Cl$: C, 63.74; H, 8.35; Cl, 7.53. Found: C, 63.80; H, 8.30; Cl, 7.35.

PREPARATION 4.—4-CHLORO-11β,17α-DIHYDROXYPREGNANE-3,20-DIONE 3-ETHYLENE GLYCOL KETAL

A solution of one gram of 4-chloro-11β,17α-dihydroxypregnane-3,20-dione 3,20-ethylene glycol diketal (from Preparation 3) in fifty milliliters of acetone containing ten milliliters of water and 0.1 milliliter of sulfuric acid was permitted to stand at room temperature for two hours. The solution was then concentrated under a stream of air, diluted with water, and extracted with ethylene dichloride. The ethylene dichloride extract, after drying, was chromatographed over eighty grams of Florisil (magnesium silicate). The chromatograph was eluted with eighty-milliliter fractions of solvent as indicated below.

| Fraction No. | Solvent | Residue (Weight, mg.) |
|---|---|---|
| 1–3 | ethylene dichloride | 5 |
| 4 | ethylene dichloride plus 4% acetone | 17 |
| 5 | do | 122 |
| 6 | do | 180 |
| 7 | ethylene dichloride plus 6% acetone | 286 |
| 8 | do | 130 |
| 9 | do | 39 |
| 10 | do | 17 |
| 11–14 | ethylene dichloride plus 9% acetone | 17 |
| 15 | ethylene dichloride plus 20% acetone | 20 |
| 16 | do | 12 |
| 17–20 | do | 9 |

Fractions 4–8 (708 milligrams) were combined and recrystallized from ethyl acetate-hexane to give 560 milligrams of 4-chloro-11β,17α-dihydroxypregnane-3,20-dione 3-ethylene glycol ketal; melting point 183 to 185 degrees centigrade. Further recrystallization from ethyl acetate-hexane resulted in purer product of melting point 194 to 196 degrees centigrade (with decomposition); $[\alpha]_D^{23}$ plus 82 degrees (acetone).

*Analysis.*—Per cent calculated for $C_{23}H_{35}O_5Cl$: C, 64.70; H, 8.26. Found: C, 64.57; H, 8.13.

PREPARATION 5.—4-CHLORO-11β,17α-DIHYDROXYPREGNANE-3,20-DIONE 3-ETHYLENE GLYCOL KETAL

A mixture of 500 milligrams of 4-chloro-11β,17α-dihydroxypregnane-3,20-dione 3,20-ethylene glycol diketal (from Preparation 3) in 25 milliliters of ether, fifteen milliliters of water, and fifteen milliliters of concentrated hydrochloric acid, was stirred at room temperature for sixteen hours. The ether phase was separated, the water phase was extracted two times with ether, and the ether extracts were combined with the main ether phase. The combined ether solution was then concentrated to a small volume whereupon crystallization took place. The yield of 4-chloro-11β,17α-dihydroxypregnane-3,20-dione 3-ethylene glycol ketal was 300 milligrams of melting point 174 to 192 degrees centigrade. Recrystallization from ethyl acetate-hexane gave 210 milligrams of purified material of melting point 194 to 196 degrees centigrade.

PREPARATION 6.—4-CHLORO-21-BROMO-11β,17α-DIHYDROXYPREGNANE-3,20-DIONE 3-ETHYLENE GLYCOL KETAL

Four hundred milligrams of 4-chloro-11β,17α-dihydroxypregnane-3,20-dione 3-ethylene glycol ketal (from Preparation 4) was dissolved in fifteen milliliters of chloroform and a total of 3.2 milliliters of bromine in acetic acid was added dropwise and at such a rate as to permit decolorization of each drop before the subsequent drop was added. The solution was then diluted with ether, washed with a cold dilute solution of sodium bicarbonate, and with water, and dried. Removal of the solvent gave 320 milligrams of 4-chloro-21-bromo-11β,17α-dihydroxypregnane-3,20-dione 3-ethylene glycol ketal; melting point 199 to 201 degrees centigrade (with decomposition).

*Analysis.*—Per cent calculated for $C_{23}H_{35}O_5BrCl$: total halogen, 22.76. Found: total halogen, 21.75.

PREPARATION 7.—4-CHLORO-11β,17α-DIHYDROXY-21-ACETOXYPREGNANE-3,20-DIONE 3-ETHYLENE GLYCOL KETAL

A mixture of 1.77 grams (0.0035 mole) of 4-chloro-11β,17α-dihydroxy-21-bromopregnane-3,20-dione 3-ethylene glycol ketal (from Preparation 6), two grams of potassium acetate, fifty milligrams of potassium iodide, and 0.5 milliliter of acetic acid in 300 milliliters of acetone was heated under reflux for sixteen hours. The mixture was filtered and the filtrate was concentrated to dryness under reduced pressure. The residue was dissolved in ethyl acetate, filtered to remove inorganic salts, and was allowed to crystallize. The yield of 4-chloro-11β,17α-dihydroxy-21-acetoxypregnane-3,20-dione 3-ethylene glycol ketal was 1.39 grams (84.8 percent); melting point 231 to 234 degrees centigrade. Recrystallization from the same solvent raised the melting point to 232 to 233 degrees centigrade.

Analysis.—Per cent calculated for $C_{25}H_{37}O_7Cl$: C, 61.91; H, 7.69; Cl, 7.31. Found: C, 62.17; H, 7.73; Cl, 7.16.

Following the same procedure as above other acyloxy groups may be substituted in the 21-position by reaction of 4 - chloro-21-bromo-11β,17α-dihydroxypregnane-3,20-dione 3-ethylene glycol ketal with the appropriate acylating agent. Such acyloxy groups include propionoxy, butyroyloxy, valeroyloxy, hexanoyloxy, heptanoyloxy, octanoyloxy, benzoyloxy, trimethylacetoxy, cyclopentylpropionoxy, and others.

PREPARATION 8.—4-CHLORO-11β,17α,21-TRIHYDROXYPREG-NANE-3,20-DIONE 3-ETHYLENE GLYCOL KETAL

A solution of 100 milligrams of 4-chloro-11β,17α-dihydroxy-21-bromopregnane-3,20-dione 3-ethylene glycol ketal (from Preparation 6) in fifty milliliters of alcohol and fifty milliliters of 0.1 N sodium hydroxide was permitted to stand at 25 degrees centigrade under nitrogen for ten minutes. The pH was adjusted to seven with dilute hydrochloric acid. The solution was then diluted with 200 milliliters of water and repeatedly extracted with ether. The ether extract was evaporated to dryness and the residue was purified by chromatography over Florisil to yield ten milligrams of 4-chloro-11β,17α,21-trihydroxypregnane-3,20-dione 3-ethylene glycol ketal. The structure of this compound, which was not crystalline, was confirmed by infrared analysis.

PREPARATION 9.—4-CHLORO-17α-HYDROXYPREGNANE-3,11,20-TRIONE 3-ETHYLENE GLYCOL KETAL

A solution of 100 milligrams of 4-chloro-17α-hydroxypregnane-3,11,20-trione 3,20-ethylene glycol diketal (from Preparation 2), four milliliters of water, and a drop of concentrated sulfuric acid, in ten milliliters of acetone was allowed to stand at room temperature for 24 hours. The solution was then diluted with water until crystallization took place. The crystalline material was isolated by filtration and was recrystallized from methylene chloride-hexane to yield purified 4-chloro-17α-hydroxypregnane-3,11,20-trione 3-ethylene glycol ketal (87 percent); melting point 194 to 203 degrees centigrade; $[\alpha]_D^{25}$ plus 83 degrees (acetone).

Analysis.—Per cent calculated for $C_{23}H_{33}O_5Cl$: C, 65.00; H, 7.82; Cl, 8.34. Found: C, 65.16; H, 7.90; Cl, 8.37.

PREPARATION 10.—4-CHLORO-17α-HYDROXY-21 - ACETOXY-PREGNANE-3,11,20-TRIONE 3-ETHYLENE GLYCOL KETAL

This compound can be prepared from 4-chloro-17α-hydroxypregnane-3,11,20-trione 3-ethylene glycol ketal of Preparation 9, by bromination at the 21-position according to the procedure of Example 3, followed by replacement of the bromine with acetate according to the procedure of Example 4. The product, 4-chloro-17α-hydroxy - 21 - acetoxypregnane - 3,11,20-trione 3-ethylene glycol ketal, was crystallized from isopropyl alcohol and melted at 228–232 degrees centigrade.

Anaylsis.—Per cent calculated for $C_{23}H_{31}O_6Cl$: C, 62.93; H, 7.12; Cl, 8.08. Found: C, 62.46; H, 7.48; Cl, 7.60.

Example 1.—17α-hydroxycorticosterone 21-acetate (Compound F acetate)

A mixture of three grams (0.00618 mole) of 4-chloro-11β,17α-dihydroxy-21-acetoxypregnane-3,20-dione 3-ethylene glycol ketal (Preparation 7), 0.15 milliliter of sulfuric acid, thirty milliliters of acetic acid, and nine milliliters of water was heated at seventy degrees centigrade for 1.5 hours. The steroid gradually dissolved during this time and the resulting solution was cooled to 25 degrees centigrade and 475 milligrams of anhydrous sodium acetate was added thereto. The reaction mixture was then covered with nitrogen and a solution of 1.01 grams of sodium acetate and 1.36 grams of semicarbazide hydrochloride in three milliliters of water was added. After stirring the resultant reaction mixture at 25 degrees centigrade for thirty minutes, during which time the characteristic color change (from colorless to yellow to light orange to colorless) of this reaction was noted, three milliliters of distilled pyruvic acid was added and the mixture was heated at fifty degrees centigrade for an additional thirty minutes, after which it was cooled to 25 degrees centigrade and three grams of sodium acetate were added thereto. The solvent was then removed at a reduced pressure and the residue, which contained a considerable amount of inorganic salts, was triturated with three 75-milliliter portions of methylene chloride in order to dissolve the steroidal material. The methylene chloride solution was treated with fifteen milliliters of acetic anhydride and thirty milliliters of pyridine for one hour at 25 degrees centigrade, after which the solution was washed with water, dilute acid, cold one percent sodium hydroxide solution, and water. After drying over sodium sulfate, the solvent was removed under reduced pressure to yield a partially crystalline residue which after trituration with ethyl acetate gave 1.77 grams (70.9 percent) of 17α-hydroxycorticosterone 21-acetate; melting point 207 to 214 degrees centigrade.

In another similar experiment a yield of 79.6 percent of Compound F acetate was obtained.

17α-hydroxycorticosterone 21-acetate is similarly obtained by treatment of 4-bromo-11β,17α-dihydroxy-21-acetoxypregnane-3,20,dione 3-ethylene glycol ketal according to the procedure of the above example.

Following the procedure of the above example, other 21-acylates of 17α-hydroxycorticosterone can be prepared from the appropriate 4-chloro-11β,17α-dihydroxy-21-acyloxypregnane-3,20-dione 3-ethylene glycol ketal. Such 21-acylates include, for example, the propionate, butyrate, valerate, hexanoate, heptanoate, octanoate, benzoate, trimethylacetate, cyclopentyl-propionate, and the like. Preferred 17α-hydroxycorticosterone 21-acylates are those wherein the acyloxy group has the formula AcO, Ac being the acyl radical of a monocarboxylic hydrocarbon acid containing from one to eight carbon atoms, inclusive. If it is desired to reacylate before isolation of the 17α-hydroxycorticosterone 21-acylate, an acylating agent corresponding to the acyloxy group of the starting material is employed.

Example 2.—17α-hydroxycorticosterone (Compound F)

To a solution of 1.5 grams of 17α-hydroxycorticosterone 21-acetate (prepared as in Example 1) dissolved in fifteen milliliters of dioxane and 75 milliliters of methanol was added 0.26 gram of sodium methoxide under an atmosphere of nitrogen. After ten minutes at 25 degrees centigrade, the pH was adjusted to about seven with acetic acid and the solvent was removed under reduced pressure. The residue was triturated with three 75-milliliter portions of boiling ethyl acetate and the combined ethyl acetate solution was concentrated to 65 milliliters. On cooling, 890 milligrams (66.1 percent) of crystalline 17α-hydroxycorticosterone, melting point 205 to 208 degrees centigrade, was obtained. A second crop of 140 milligrams (10.0 percent) melting point 204 to 207 degrees centigrade, was obtained from the mother liquors. The total yield was 76.1 percent.

17α-hydroxycorticosterone is also prepared according to the procedure of Example 1, by treating 4-chloro-11β,17α,21-trihydroxypregnane-3,20-dione 3-ethylene glycol ketal (from Preparation 8) or 4-bromo-11β,17α,21-trihydroxypregnane-3,20-dione 3-ethylene glycol ketal with sulfuric acid and semicarbazide followed by pyruvic acid.

*Example 3.—17α-hydroxycorticosterone 21-acetate (Compound F acetate)*

To a solution of 2.2 grams of 2,4-dinitrophenylhydrazine in fifty milliliters of acetic acid and fifteen milliliters of water, at seventy degrees centigrade, there was added five grams of 4-chloro-221-acetoxy-11β,17α-dihydroxypregnane-3,20-dione 3-ethylene glycol ketal. The reaction mixture was heated at seventy degrees centigrade for four hours and was then cooled to fifty degrees centigrade, after which five milliliters of distilled pyruvic acid were added and the resulting solution was heated at fifty degrees centigrade for 1.75 hours. Five grams of sodium acetate were added and the solvent was removed under reduced pressure. The residue was triturated with 150 milliliters of methylene chloride and the methylene chloride solution (containing the steroid) was acetylated with twenty milliliters of pyridine and ten milliliters of acetic anhydride at room temperature. The solution was then washed with water, dilute acid, cold one percent sodium hydroxide, and water, and the solvent, after drying over sodium sulfate, was removed under reduced pressure. The partially crystalline residue after trituration with ethyl acetate gave 3.74 grams (90.2 percent) of crude 17α-hydroxycorticosterone 21-acetate. A second crop of 100 milligrams (2.4 percent) was obtained. The crude crystalline material was recrystallized from ethyl acetate, after removing the color with activated carbon, to yield 64 percent of purified 17α-hydroxycorticosterone 21-acetate in two crops. The first crop melted at 213 to 218 degres centigrade while the second crop melted at 193 to 198 degrees centigrade.

17α-hydroxycorticosterone 21-acetate is similarly obtained by treatment of 4-bromo-21-acetoxy-11β,17α-dihydroxypregnane-3,20-dione 3-ethylene glycol ketal according to the procedure of the above example.

*Example 4.—17α-hydroxycorticosterone 21-acetate (Compound F acetate)*

A solution of 440 milligrams of 2,4-dinitrophenylhydrazine in three milliliters of acetic acid and three milliliters of water containing 0.2 milliliter of sulfuric acid was prepared by warming the ingredients to about seventy to eighty degrees centigrade. This solution was added to a suspension of 4-chloro-11β,17α-dihydroxy-21-acetoxypregnane-3,20-dione 3-ethylene glycol ketal in five milliliters of acetic acid and in the presence of an atmosphere of nitrogen which was maintained throughout the reaction. The mixture was heated at seventy degrees centigrade for 0.5 hour and was then permitted to stand at room temperature for two hours, after which time ten milliliters of acetic acid and ten milliliters of chloroform were added. One milliliter of pyruvic acid was added and the reaction mixture heated at fifty degrees centigrade for two hours, after which two grams of sodium acetate were added and the solution stirred for five minutes. After removal of the solvent under reduced pressure, the residue was triturated three times with chloroform and filtered to remove the insoluble sodium salt of the 2,4-dinitrophenylhydrazone of pyruvic acid. The chloroform solution was washed successively with water, dilute sodium bicarbonate solution, water, and was then dried over sodium sulfate and concentrated to dryness.

For ease of isolation and in order to compensate for any hydrolysis which might have occurred during the reaction, the residue was reacetylated with a mixture of two milliliters of acetic anhydride and two milliliters of pyridine at 26 degrees centigrade for one hour. The excess acetic anhydride was destroyed by the addition of water and the product was extracted with methylene dichloride. The methylene dichloride solution was washed successively with dilute hydrochloric acid, water, dilute sodium bicarbonate solution, water, and was then dried over sodium sulfate and concentrated to dryness. The residue was crystallized from acetone and gave, in two crops, 560 milligrams (71.1 percent) of crude crystalline 17α-hydroxycorticosterone 21-acetate. The crude crystalline product was recrystallized from fifty milliliters of methanol, after treatment with a decolorizing agent (Darco G-60), to yield 410 milligrams (51.8 percent) of purified 17α-hydroxycorticosterone 21-acetate; melting point 208 to 211 degrees centigrade.

*Example 5.—17α-hydroxycorticosterone 21-acetate (Compound F acetate)*

Under an atmosphere of nitrogen, a mixture of one gram of 4-chloro-11β,17α-dihydroxy-21-acetoxypregnane-3,20-dione 3-ethylene glycol ketal, thirty milliliters of acetic acid, six milliliters of water, and 72 milligrams of semicarbazide hydrochloride were heated at seventy degrees centigrade for five hours, after which the solvent was removed by distillation under reduced pressure. The residue was partially dissolved in a mixture of water and ethyl acetate giving 190 milligrams of insoluble material which was isolated by filtration. The organic layer was separated, washed, and evaporated to dryness to give 807 milligrams of an oil. Both the solid material and oil were combined and dissolved in a mixture of twenty milliliters of dioxane, five milliliters of water, two milliliters of pyruvic acid and five drops of acetic acid. This mixture was then heated at 65 degrees centigrade for 1.5 hours, after which the solvent was distilled under reduced pressure and the residue was dissolved in methylene dichloride. After washing and drying, the methylene dichloride solution was evaporated to dryness and the residue was reacetylated with a mixture of three milliliters of pyridine and two milliliters of acetic anhydride. The reacetylated material was worked up as in Example 4 to give 680 milligrams of crude crystalline 17α-hydroxycorticosterone 21-acetate.

*Example 6.—17α-hydroxycorticosterone and 17α-hydroxycorticosterone 21-acetate*

A mixture of 200 milligrams of 4-chloro-21-acetoxy-11β,17α-dihydroxypregnane-3,20-dione 3-ethylene glycol ketal, 62 milligrams of phenylhydrazine hydrochloride, four milliliters of acetic acid, one milliliter of water and two drops of concentrated hydrochloric acid were heated under an atmosphere of nitrogen at 60 to 65 degrees centigrade for two hours. The solution was concentrated under reduced pressure and the residue was dissolved in methylene chloride. The methylene chloride solution was washed with water, sodium bicarbonate, water, and was then dried over sodium sulfate and concentrated to dryness. The residue, when analyzed by paper chromatography, showed the presence of both 17α-hydroxycorticosterone and 17α-hydroxycorticosterone 21-acetate.

17α-hydroxycorticosterone and 17α-hydroxycorticosterone 21-acetate are similarly obtained from 4-bromo-21-acetoxy-11β,17α-dihydroxypregnane-3,20-dione 3-ethylene glycol ketal according to the procedure of the above example.

*Example 7.—Progesterone (4-pregnene-3,20-dione)*

In essentially the same manner as given in Example 1, and using ortho-hydroxybenzaldehyde in place of pyruvic acid, 4-pregnene-3,20-dione is prepared from 4-chloropregnane-3,20-dione 3-propane-1,3-diol ketal.

*Example 8.—11β,17α-dihydroxy-4-pregnene-3,20-dione*

A solution of one gram of 4-chloro-11β,17α-dihydroxypregnane-3,20-dione 3-ethylene glycol ketal in ten milliliters of acetic acid, three milliliters of water, and 0.05 milliliter of sulfuric acid was heated at seventy to eighty degrees centigrade for two hours. There was then added 160 milligrams of sodium acetate and a solution of 585 milligrams of semicarbazide hydrochloride and 430 milligrams of sodium acetate in 1.5 milliliters of water. After one hour, one milliliter of pyruvic acid was added and the reaction mixture was heated at seventy degrees centigrade for an additional hour. The solvent was then removed under reduced pressure and the residue was extracted with chloroform. The chloroform solution was washed, dried and evaporated to dryness to give 887 milligrams of an oil, which, on crystallization from five milliliters of acetone yielded 193 milligrams of 11β,17α-dihydroxy-4-pregnene-3,20-dione; melting point 197 to 215 degrees centigrade.

*Example 9.—11β,17α-dihydroxy-4-pregnene-3,20-dione*

In essentially the same manner as given in Example 8, 11β,17α-dihydroxy-4-pregnene - 3,20 - dione is prepared from 4-bromo-11β,17α-dihydroxypregnane-3,20-dione 3-ethylene glycol ketal.

*Example 10.—17α-hydroxy-4-pregnene-3,11,20-trione*

In essentially the same manner as given in Eaxmple 1, and using para-hydroxybenzaldehyde in place of pyruvic acid, 17α-hydroxy-4-pregnene-3,11,20-trione is prepared from 4-chloro-17α-hydroxypregnane - 3,11,20 - trione 3-ethylene glycol ketal.

*Example 11.—Cortisone acetate (17α-hydroxy-21-acetoxy-4-pregnene-3,11,20-trione)*

In essentially the same manner as given in Example 1, 17α-hydroxy-21-acetoxy-4-pregnene-3,11,20-trione is prepared from 4-chloro-17α-hydroxy-21-acetoxypregnane-3,11,20-trione 3-ethylene glycol ketal.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a $\Delta^4$-3-ketosteroid having a pregnane carbon skeleton which comprises reacting a 4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4-dinitrophenylhydrazine, and hydroxylamine, in the presence of water and acid, and thereafter reacting the unsaturated ketonic nitrogen derivative thus-formed, in the presence of water, with a carbonyl compound selected from the group consisting of pyruvic acid, benzaldehyde and hydroxybenzaldehydes, to produce the corresponding $\Delta^4$-3-ketosteroid.

2. A process for the production of a $\Delta^4$-3-ketosteroid having a pregnane carbon skeleton which comprises reacting, in an organic solvent, a 4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4-dinitrophenylhydrazine, and hydroxylamine, in the presence of water and a mineral acid, and thereafter reacting the unsaturated ketonic nitrogen derivative thus-formed in the presence of water, with a carbonyl compound selected from the group consisting of pyruvic acid, benzaldehyde and hydroxybenzaldehydes, to produce the corresponding $\Delta^4$-3-ketosteroid.

3. A process for the production of a $\Delta^4$-3-ketosteroid having a pregnane carbon skeleton which comprises reacting, in an organic solvent, a 4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid and thereafter reacting the unsaturated ketonic nitrogen derivative thus-formed, in the presence of water, with a carbonyl compound selected from the group consisting of pyruvic acid, benzaldehyde and hydroxybenzaldehydes, to produce the corresponding $\Delta^4$-3-ketosteroid.

4. A process for the production of a $\Delta^4$-3-ketosteroid having a pregnane carbon skeleton which comprises reacting, in acetic acid, a 4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid and thereafter reacting the unsaturated ketonic nitrogen derivative thus-formed, in the presence of water, with a carbonyl compound selected from the group consisting of pyruvic acid, benzaldehyde and hydroxybenzaldehydes, to produce the corresponding $\Delta^4$-3-ketosteroid.

5. A process for the production of a $\Delta^4$-3-ketosteroid having a pregnane carbon skeleton which comprises reacting, in acetic acid at a temperature between about twenty and about eighty degrees centigrade, a 4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4 - dinitrophenylhydrazine, and hydroxylamine, in the presence of water and a mineral acid selected from the group consisting of sulfuric acid and hydrochloric acid and thereafter reacting the unsaturated ketonic nitrogen derivative thus-formed, in the presence of water and at a temperature between about twenty and about eighty degrees centigrade, with a carbonyl compound selected from the group consisting of pyruvic acid, benzaldehyde and hydroxylbenzaldehydes, to produce the corresponding $\Delta^4$-3-ketosteroid.

6. A process for the production of a $\Delta^4$-3-ketosteroid having a pregnane carbon skeleton which comprises reacting, in acetic acid at a temperature between about twenty and about eighty degrees centigrade, a 4-halo-3-cyclic ketal steroid having a pregnane carbon skeleton wherein the halogen is selected from the group consisting of chlorine and bromine with semicarbazide in the presence of water and sulfuric acid, and thereafter reacting the unsaturated ketonic nitrogen derivative thus-formed, in the presence of water and at a temperature between about twenty and about eighty degrees centigrade, with pyruvic acid, to produce the corresponding $\Delta^4$-3-ketosteroid.

7. A process for the production of an 11β-hydroxy-$\Delta^4$-3-ketosteroid having a pregnane carbon skeleton which comprises reacting, in an organic solvent, an 11β-hydroxy-4-halo-3-cyclic ketal steroid having a pregnane carbon skeleton wherein the halogen is selected from the group consisting of chlorine and bromine with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric and hydrochloric acid, and thereafter reacting the unsaturated ketonic nitrogen derivative thus-formed, in the presence of water, with a carbonyl compound selected from the group consisting of pyruvic acid, benzaldehyde and hydroxybenzaldehydes, to produce the corresponding $\Delta^4$-3-ketosteroid.

8. A process for the production of a 17α-hydroxycorticosterone 21-acylate which comprises reacting, in an organic solvent, a 4-halo-11β,17α-dihydroxy-21-acyloxypregnane-3,20-dione 3-cyclic ketal wherein the halogen is selected from the group consisting of chlorine and bromine, with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid, and thereafter reacting the unsaturated ketonic nitrogen derivative thus-formed, in the presence of water, with a carbonyl compound selected from the group consisting of pyruvic acid, benzaldehyde and hydroxybenzaldehydes, to produce the corresponding 17α-hydroxycorticosterone 21-acylate.

9. A process for the production of a 17α-hydroxycorticosterone 21-acylate which comprises reacting, in acetic acid at a temperature of between about twenty and about eighty degrees centigrade a 4-halo-11β,17α-dihydroxy-21-acyloxypregnane-3,20-dione 3-cyclic ketal wherein the halogen is selected from the group consisting of chlorine and bromine, with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid, and thereafter reacting the unsaturated ketonic nitrogen derivative thus-formed, in the presence of water and at a temperature between about twenty and about eighty degrees centigrade, with a carbonyl compound selected from the group consisting of pyruvic acid, benzaldehyde and hydroxybenzaldehydes, to produce the corresponding 17α-hydroxycorticosterone 21-acylate.

10. A process for the production of 17α-hydroxycorticosterone 21-acetate which comprises reacting in acetic acid at a temperature between about twenty and about eighty degrees centigrade, 4-chloro-11β,17α-dihydroxy-21-acetoxypregnane-3,20-dione 3-ethylene glycol ketal with semicarbazide, in the presence of water and sulfuric acid, and thereafter reacting the unsaturated ketonic nitrogen derivative thus-formed, in the presence of water and at a temperature between about twenty and about eighty degrees centigrade, with pyruvic acid, to produce 17α-hydroxycorticosterone 21-acetate.

11. A process for the production of 17α-hydroxycorticosterone which comprises reacting, in an organic solvent, a 4-halo-11β,17α,21-trihydroxypregnane-3,20-dione 3-cyclic ketal wherein the halogen is selected from the group consisting of chlorine and bromine, with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid, and thereafter reacting the unsaturated ketonic nitrogen derivative thus-formed, in the presence of water, with a carbonyl compound selected from the group consisting of pyruvic acid, benzaldehyde and hydroxybenzaldehydes, to produce 17α-hydroxycorticosterone.

12. A process for the production of 17α-hydroxycorticosterone which comprises reacting, in acetic acid at a temperature of about twenty to about eighty degrees centigrade, a 4-halo-11β,17α,21-trihydroxypregnane-3,20-dione 3-cyclic ketal wherein the halogen is selected from the group consisting of chlorine and bromine, with a nitrogen carbonyl reagent selected from the group consisting of semicarbazide, hydrazine, phenylhydrazine, 2,4-dinitrophenylhydrazine, and hydroxylamine, in the presence of water and a mineral acid selected from the group consisting of sulfuric acid and hydrochloric acid, and thereafter reacting the unsaturated ketonic nitrogen derivative thus-formed, in the presence of water and at a temperature between about twenty and about eighty degrees centigrade, with a carbonyl compound selected from the group consisting of pyruvic acid, benzaldehyde and hydroxybenzaldehydes, to produce 17α-hydroxycorticosterone.

13. A process for the production of 17α-hydroxycorticosterone which comprises reacting, in acetic acid at a temperature between about twenty and about eighty degrees centigrade, a 4-halo-11β,17α,21-trihydroxypregnane-3,20-dione 3-ethylene glycol ketal wherein the halogen is selected from the group consisting of chlorine and bromine, with semicarbazide, in the presence of water and sulfuric acid, and thereafter reacting the unsaturated ketonic nitrogen derivative thus-formed, in the presence of water and at a temperature between about twenty and about eighty degrees centigrade, with pyruvic acid, to produce 17α-hydroxycorticosterone.

14. A process for the production of a $\Delta^4$-3-ketosteroid having a pregnane carbon skeleton which includes the steps of (1) mixing together a steroid 4-halo-3,11,20-trione having a pregnane carbon skeleton wherein the halogen is selected from the group consisting of chlorine and bromine, and an alkanediol containing from two to eight carbon atoms, inclusive, in the presence of water and an acid catalyst to produce a steroid 4-halo-3,11,20-trione 3,20-alkanediol diketal, (2) reacting the thus-produced 3,20-alkanediol diketal with a reducing agent to convert the 11-ketone group to an 11β-hydroxy group, (3) hydrolyzing the thus-produced 11β-hydroxy-3,20-alkanediol diketal with acid to cause selective hydrolysis of the 20-cyclic ketal group to a ketone group, (4) reacting the 3-alkanediol monoketal thus-produced with a nitrogen carbonyl reagent selected from the group consisting of semicarbazide, hydrazine, phenylhydrazine, 2,4-dinitrophenylhydrazine, and hydroxylamine, in the presence of an acid, and thereafter reacting the unsaturated ketonic nitrogen derivative thus-formed, in the presence of water, with a carbonyl compound selected from the group consisting of pyruvic acid, benzaldehyde and hydroxybenzaldehydes, to form the corresponding $\Delta^4$-3-ketosteroid.

References Cited in the file of this patent

UNITED STATES PATENTS

| | | |
|---|---|---|
| 2,288,854 | Stavely | July 7, 1942 |
| 2,356,154 | Fernholz | Aug. 22, 1944 |
| 2,447,463 | Hershberg | Aug. 17, 1948 |
| 2,590,978 | Kendall | Apr. 1, 1952 |
| 2,590,993 | McGuckin | Apr. 1, 1952 |